(12) United States Patent
Mishler et al.

(10) Patent No.: US 9,550,280 B1
(45) Date of Patent: Jan. 24, 2017

(54) TOOL FOR INSTALLING AND REMOVING THREADED CAMERA LENSES

(75) Inventors: Robert Mishler, Beaverton, OR (US);
Robert Gainer, Newberg, OR (US);
Laurens Nunnink, Simpelveld (NL)

(73) Assignee: Cognex Corporation, Natick, MA (US)

( * ) Notice: Subject to any disclaimer, the term of this patent is extended or adjusted under 35 U.S.C. 154(b) by 415 days.

(21) Appl. No.: 13/431,475

(22) Filed: Mar. 27, 2012

(51) Int. Cl.
*B25B 9/02* (2006.01)
*B25B 13/50* (2006.01)
*H01J 3/32* (2006.01)
*G03B 17/56* (2006.01)

(52) U.S. Cl.
CPC .............. *B25B 9/02* (2013.01); *B25B 13/50* (2013.01); *B25B 13/5008* (2013.01); *G03B 17/56* (2013.01); *H01J 3/32* (2013.01)

(58) Field of Classification Search
CPC .......... H01K 3/32; H01J 9/006; B25B 11/005; B25B 11/007; B25B 9/00; B25B 9/02; B25B 13/5008; B25B 13/50; G03B 17/56; G03B 17/566; G03B 17/568; Y10T 29/537; Y10T 29/53796; Y10T 29/53943; Y10T 29/53909; Y10T 29/53961; Y10T 29/54
USPC ............. 81/53.11, 53.1, 53.12, 57.33, 57.34, 81/57.35, 176.1, 176.15, 176.2; 294/19.2, 294/1.2, 174
See application file for complete search history.

(56) References Cited

U.S. PATENT DOCUMENTS

| | | | | |
|---|---|---|---|---|
| 1,541,839 A | * | 6/1925 | Metzler et al. | 81/53.11 |
| 2,384,334 A | * | 9/1945 | Olson | 294/187 |
| 2,607,620 A | * | 8/1952 | Oliveri | 294/187 |
| 3,136,573 A | * | 6/1964 | Harke | 294/19.2 |
| 3,473,423 A | * | 10/1969 | Peck | 81/64 |
| 3,584,908 A | * | 6/1971 | Ray | 294/1.2 |
| 4,979,355 A | * | 12/1990 | Ulevich | 81/185 |
| 5,009,133 A | * | 4/1991 | Carey | 81/180.1 |
| D339,970 S | | 10/1993 | Marshall et al. | |
| 5,732,990 A | | 3/1998 | Yavitz et al. | |
| 6,452,733 B2 | | 9/2002 | Verbiest | |
| 6,683,654 B1 | | 1/2004 | Haijima | |
| 6,889,825 B2 | | 5/2005 | Ichikawa et al. | |
| 7,163,245 B2 | | 1/2007 | Wallock et al. | |
| 7,270,031 B1 | * | 9/2007 | Huls | 81/53.11 |
| 2007/0164576 A1 | | 7/2007 | Kim | |
| 2011/0097484 A1 | * | 4/2011 | Sakai | B05C 13/025 427/164 |

* cited by examiner

*Primary Examiner* — Jason L Vaughan
(74) *Attorney, Agent, or Firm* — Loginov & Associates (57) ABSTRACT

This invention provides a tool for tightening and loosening lenses with respect to camera bodies. The tool includes a body that defines a cavity that is slightly larger in diameter than the sidewalls of the lens adjacent the lens face. Within the cavity is a thin, high-friction, elastomeric material that resides between the edges of the lens when the cavity is pressurably engaged over the lens face. The material frictionally couples the tool body to the lens face and adjacent side walls, thereby allowing a predetermined level of torque to be applied to tighten or loosen the lens. The tool can be adapted for attachment to a handle, such as a torque wrench or can include a handle specifically adapted/contoured for grasping by a user's hand.

19 Claims, 10 Drawing Sheets

*Fig. 1*

(Background Art)

TOOL FOR INSTALLING AND REMOVING THREADED CAMERA LENSES

FIELD OF THE INVENTION

This invention relates to cameras and more particularly to tools for installing and servicing lenses used in vision system cameras.

BACKGROUND OF THE INVENTION

In the manufacture of cameras for industrial applications, such as vision systems, the use of relatively small lenses including the ubiquitous M12 base design is extremely common. Typically, the camera body includes a recessed mounting hole with internal threads to receive the external threads of the lens. During manufacture and/or in the field, it is desirable to install, and sometimes remove, the lens unit from the camera body. In doing so, the user engages the exposed face of the lens, generally in the region of the rim surrounding the optic, and turns to either tighten or loosen it.

Figure 1:
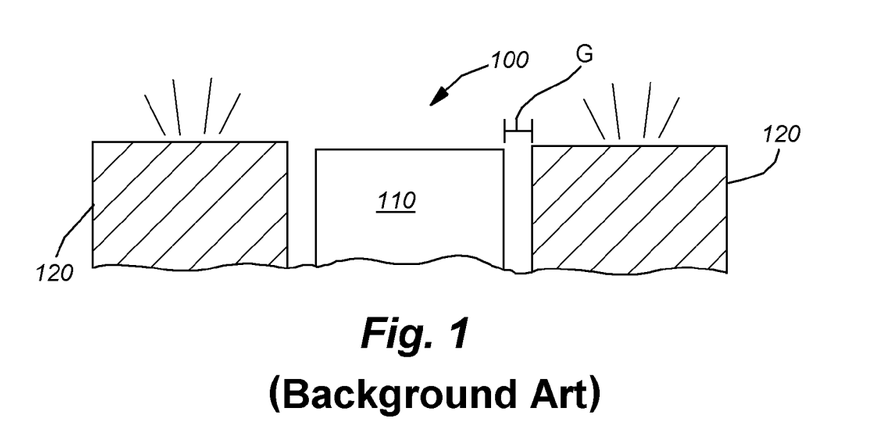
FIG. 1, already described, is a fragmentary, cutaway schematic side view of an exemplary camera body with an installed lens showing a relatively low clearance between the lens and surrounding structures.

It is common for the front and side surfaces of the lens to be relatively free of detents or other structures that can allow insertion of a tool to assist in turning the lens. When there is sufficient clearance, the user simply grasps the sides of the lens body with sufficient gripping force and tightens or loosens the lens to a desired degree. However as cameras become increasingly compact, particularly those used in vision system applications the like the In-Sight system available from Cognex Corporation of Natick, Mass., the lens becomes lower-profile and closely mounted. In such cases there may be insufficient clearance to grasp the lens body effectively. The problem is illustrated in the schematic cutaway view of the front face 100 of a vision system camera. In this example, the lens 110 is surrounded by a rig illumination structure 120 (and other bezels that) that leaves a relatively small gap G. In this arrangement, it is challenging to tighten or loosen the lens without a special tool, and even with a tool, there are typically no formations for the tool to engage on many lens types.

Accordingly, it is desirable to provide a mechanism for tightening and loosening a lens where there exists low clearance between the sides of the lens and the surrounding camera structures. This mechanism should be straightforward to use by both manufacturers and subsequent end users and allow for sufficient torque to be applied to the lens to ensure its secure tightening to and/or loosening from a mounting hole as desired. The mechanism should also avoid scratching or damaging the lens optic or surrounding face and sidewalls.

SUMMARY OF THE INVENTION

This invention overcomes disadvantages of the prior art by providing a tool for tightening and loosening lenses with respect to camera bodies. The tool includes a body that defines a cavity that is slightly larger in diameter than the sidewalls of the lens adjacent the lens face. Within the cavity is a thin, high-friction, elastomeric material that resides between the edges of the lens when the cavity is pressurably engaged over the lens face. The material frictionally couples the tool body to the lens face and adjacent side walls, thereby allowing a predetermined level of torque to be applied to tighten or loosen the lens. The tool can be adapted for attachment to a handle, such as a torque wrench or can include a handle specifically adapted/contoured for grasping by a user's hand.

In an illustrative embodiment, the a tool for installing and removing a lens having a front face, outer sidewalls adjacent the front face and an outer diameter of the outer sidewalls comprises a body having a cavity on a front end thereof, the cavity with inner sidewalls defining a diametral difference wherein an inner diameter inner sidewalls is greater than the outer diameter of the outer sidewalls of the lens. A pad is provided, constructed of a thin, friction-generating, elastomeric material that is located so as to overlap the cavity and, in a resting state define a perimeter that extends radially beyond an outer perimeter edge of the tool at the front end. The tool is constructed and arranged to engage the front face and the outer sidewalls of the lens with the pad elastically deforming and compressing into the cavity against the inner sidewalls to provide a frictional engagement between the lens and the tool. The inner sidewalls of the cavity illustratively define an approximately straight cylinder, and the front end defines an outer diameter that is less than an inner diameter of structures on a camera body surrounding the lens, such as a ring illuminator. In an embodiment, the tool body can include a socket arranged to removably attach to a drive head of a wrench, such as a torque wrench. Alternatively, the body can include a shape constructed and arranged for grasping by a hand to rotate the tool about an approximate optical axis of the lens when a longitudinal axis of the body is aligned approximately therewith. The graspable body can define an oblique shape on a cross-sectional plane taken perpendicular to the longitudinal axis. Illustratively, the body can include a bore located along the longitudinal axis that frictionally receives a unitary shaft connected to the pad. This allows the pad to be inserted during assembly and removed for replacement. The pad can define a concave dish extending at least in part into the cavity adjacent the longitudinal axis. The front end can define a taper extending along the body from a predetermined location to a front edge of the front end to assist in inserting the tool onto a lens that is recessed in the camera body. In various embodiments, such as the wrench/handle-driven embodiment, the pad defines a separate component constructed and arranged to be manually inserted between the cavity and the lens before the user places the tool over the lens to engage and rotate it. In an embodiment, the pad and the handle can each include a bore located approximately along a longitudinal axis of the body constructed and arranged to pass light from an object or fiducial to an optic of the lens when the tool is engaged with the lens. In this manner, the tool can be used to rotate the lens to an optimal focus while the user views an acquired image of a scene or fiducial.

In another illustrative embodiment, a method for installing and removing a lens having a front face, outer sidewalls adjacent the front face and an outer diameter of the outer sidewalls is provided. The method includes positioning a tool body, having a cavity with inner sidewalls on a front end thereof, so that the inner sidewalls of the cavity are approximately aligned with the outer sidewalls of the lens. An inner diameter of the inner sidewalls is greater than the outer diameter of the outer sidewalls of the lens so that the cavity can overlap the lens sidewalls by a predetermined amount (e.g. 1 millimeter). In this overlapping orientation, the user pressurably engages the front face and the outer sidewalls of the lens with a pad positioned between the cavity and the lens so as to elastically deform and compress the pad into the cavity against the inner sidewalls to provide a frictional engagement between the lens and the tool. While pressurably engaging the lens, the user can rotate the tool body to either tighten or loosen the lens.

BRIEF DESCRIPTION OF THE DRAWINGS

The invention description below refers to the accompanying drawings, of which.

DETAILED DESCRIPTION

Figure 2:
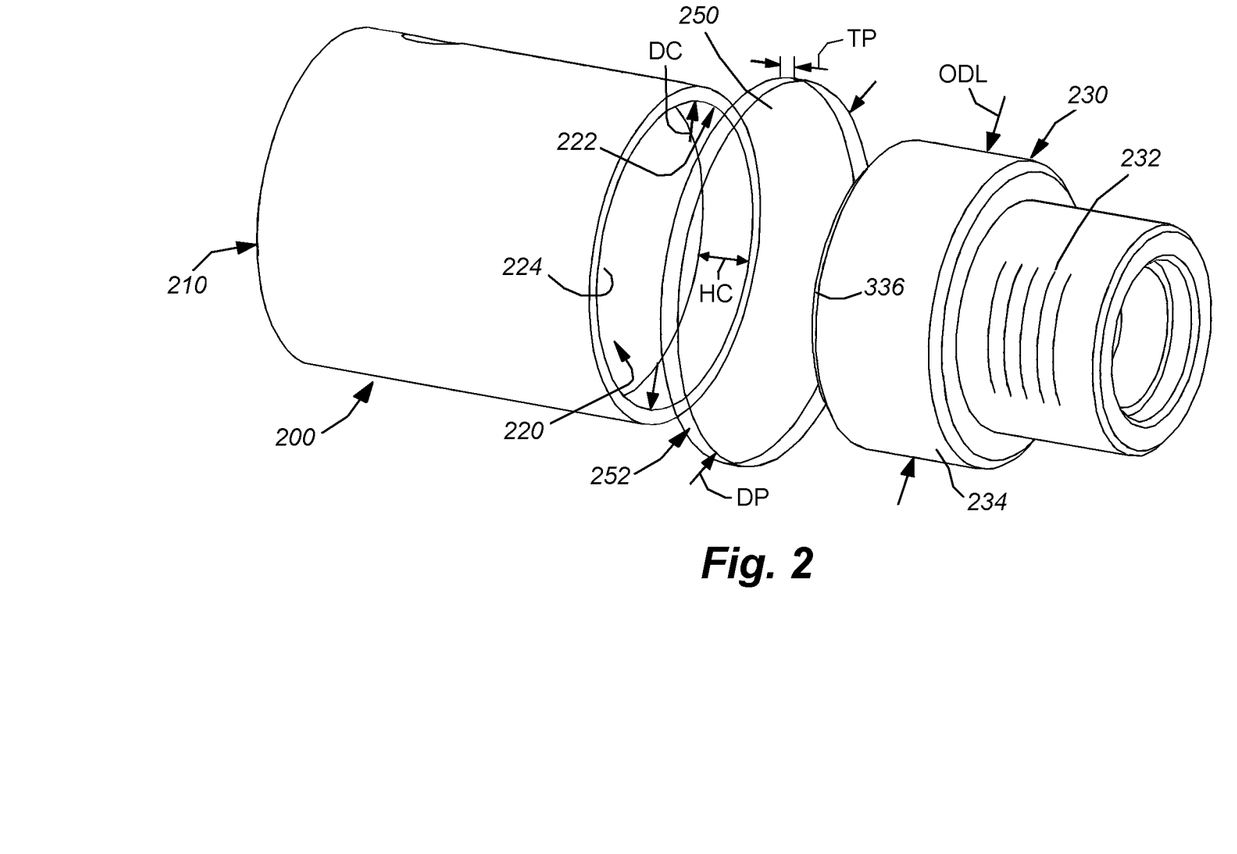
FIG. 2 is an exploded perspective view of an exemplary lens and a lens installation and removal tool with friction-generating pad for use with a socket-style wrench according to an illustrative embodiment.
Figure 3:
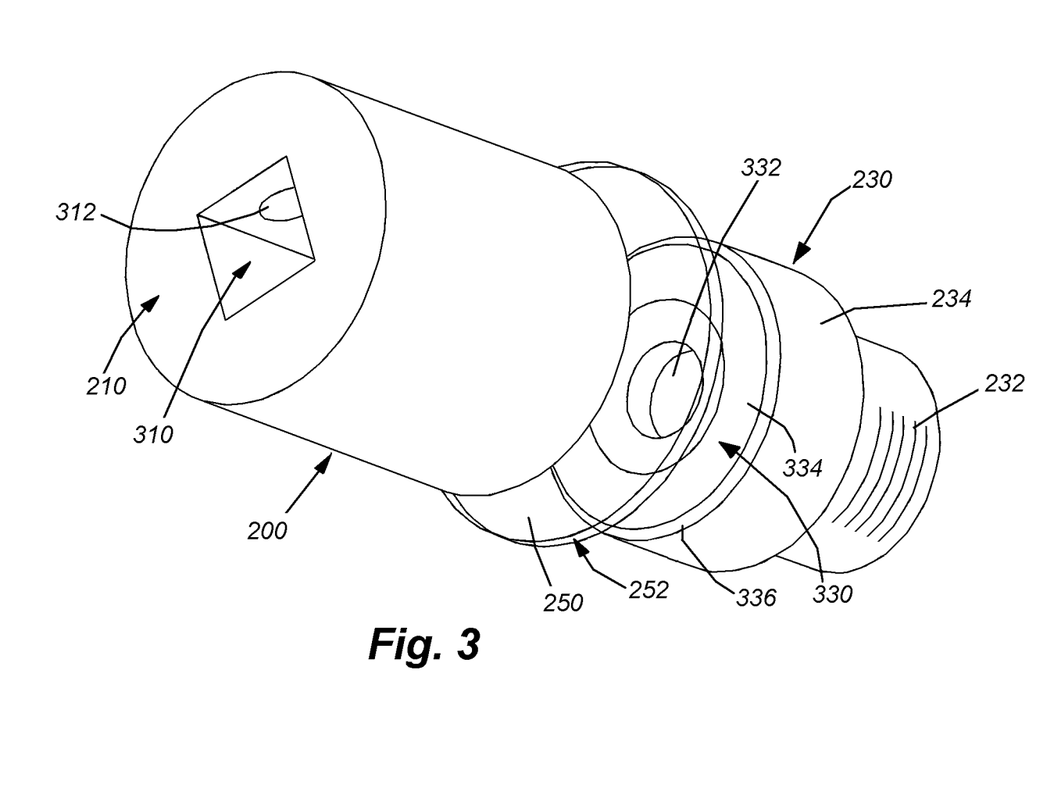
FIG. 3 is an exploded perspective view of the exemplary lens, installation and removal tool and friction-generating pad of FIG. 2 showing the socket hold on the rear end of the tool.

FIGS. 2 and 3 show a lens installation and removal tool 200 according to an illustrative embodiment. The tool 200 defines a cylindrical outer shape in the manner of a conventional socket for use in a socket wrench set. The rear 210 end includes a conventional square-drive socket recess 310 (FIG. 3). This allows attachment of a torque driver or similar handle having, for example a ¼ inch drive head. A detent 312 allows for a locking ball of the drive head to secure the engagement between the drive head and the tool 200. This is described further with reference to FIG. 4 below. Note that the use of a ¼ drive head is illustrative of a wide range of conventional and/or custom interconnections that allow the tool 200 to interface with a handle. In alternate embodiment a different size drive head can be used, such as the hex drive commonly associated with interchangeable screw driver heads. Note also, as used herein, various directional and orientation terms such as vertical, horizontal, up, down, bottom, top, side, front, rear, and the like, are used only as relative conventions and not as absolute orientations with respect to a fixed coordinate system, such as gravity.

The tool 200 defines a cavity 220 with respect to its front side. The cavity 220 is generally cylindrical, with an inner wall 222 that defines a straight cylinder with a flat base 224. This is illustrative of a variety of shapes for the inner wall, including frustoconical or ovoid. The inner diameter DC of the cavity wall 222 is approximately 16 or 17 millimeters depending upon the outer diameter ODL of the exemplary lens 230 upon which the tool is operating. The depth or height HC of the cavity 220 is highly variable. In some embodiments, the base 224 can be omitted in favor of a tube. In this embodiment, the base depth/height HC is approximately 3.5 millimeters.

The overall length of the tool is highly variable. In an embodiment the length can be between approximately 20-40 millimeters.

The lens 230 is one of a wide range of possible lens types to which the tool can be adapted. In this example, the lens 230 is a commercially available M12 mount type with external threads adapted to secure to internal threads in the camera body. One model of exemplary M12 lens is designated as LENS, FIXED, 25 MM F4, M12, 15 MM DIA RETAINER, ½ FORMAT COVER available from Universe Kogaku Inc. of Japan. This is exemplary of a wide range of possible makes and models of lenses with which the tool of various embodiments herein can be employed. The outer diameter ODL of such lenses is typically 15 or 16 millimeters, allowing about one extra millimeter of diameter between the inner diameter DC of the cavity 220 and outer diameter ODL between the lens outer side wall 234 and inner wall 222 of the cavity 220. As described further below, the axial positioning of the lens 230 within the camera base can be varied by rotating the lens, so as to allow for a desired focus, based upon the location of the camera's image plane (i.e. the optoelectronic image sensor) and the focal length of the overall arrangement. In alternate embodiments other lens types, such as those typically applicable to "board cameras" can be employed (i.e. so-called "board camera mount" lenses, including the M9 and M12).

In this example, the lens front face 330 includes the glass optic 332, surrounded by a metal rim 334 that is bounded by a small chamfer 336. While not necessary for operation of the tool, the chamfer 336 assists in making a positive engagement, as described further below.

The tool 200 employs a piece of elastomeric sheet material in the form of a disk-shaped pad 250 to grip the lens 230. The circular outer perimeter 252 of the pad 250 is illustrative of a wide range of shapes. The circular shape of the pad perimeter 252 assists the user to center the pad 250 with respect to the cylindrical cavity 220 on the tool 200. The diameter DP of the pad 250 is approximately 20 millimeters in an illustrative embodiment, but this is highly variable in alternate embodiments. The thickness TP of the pad material is approximately 31 mils (thousandths of an inch), and it is constructed from Bisco® HT-6240 silicone rubber sheeting that can be opaque or clear with a durometer of 40, a tensile strength of approximately 1000 psi, and a tear resistance of approximately 125 ppi. This sheeting is available from Rogers Corporation of Rogers, Conn. A variety of equivalent or similar elastomeric, friction-generating sheet materials having a similar or differing thickness can be used in alternate embodiments.

Figure 4:
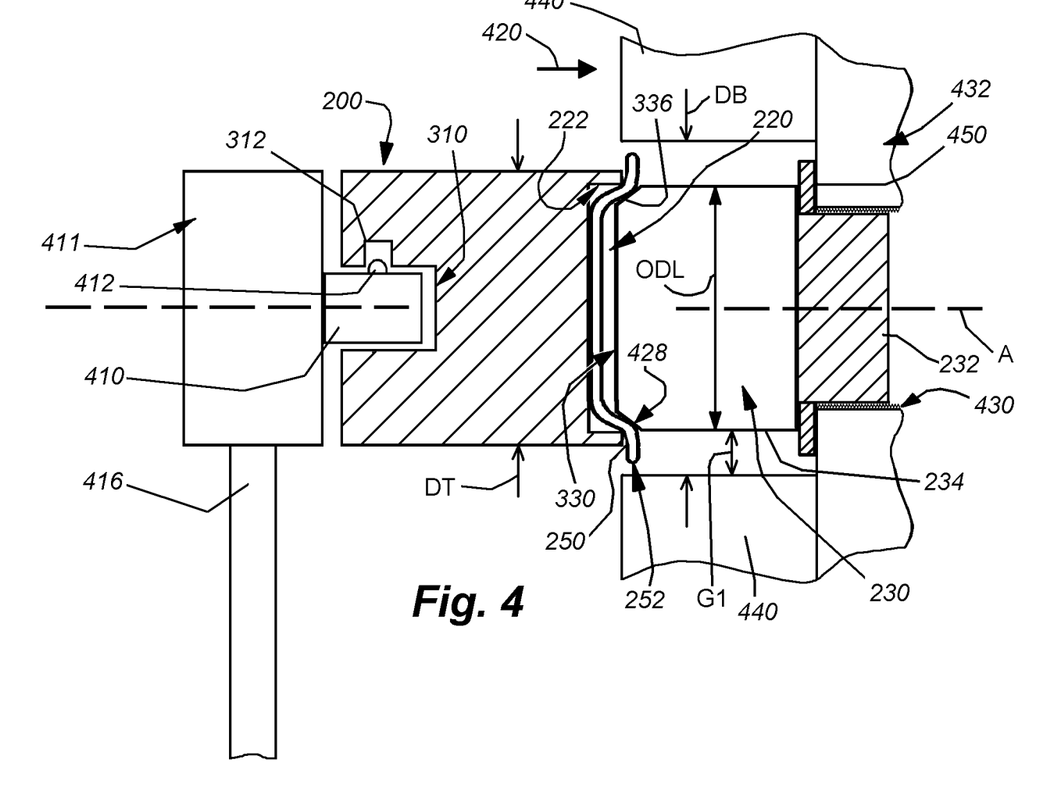
FIG. 4 is a partial cross section of the tool, with attached socket wrench and friction generating pad in engagement with the exemplary lens so as to tighten or loosen it.

With reference to FIG. 4, the tool 200 is inserted into the drive head 410 of a wrench 411, with the spring-loaded locking ball 412 engaging the socket detent 312. The wrench can be any acceptable type of wrench that affords mechanical advantage and/or ease of use to the user. In this example, it includes a lever 416. The tool cavity 220 is shown engaging (arrow 420) the front face 330 of the lens 230 under axial pressure (along longitudinal axis A). This pressure causes the lens 230 to enter the cavity with the pad 250 sandwiched between the lens sidewalls 234 and the cavity sidewalls. The difference between inner diameter DC of the cavity and the outer diameter (ODL) of the lens allows the thin pad to deform and flow/compress between the two coaxially aligned sidewalls. An impingement point/ring 428 is formed adjacent to the front edge of the cavity. In this example, the chamfer 336 helps to guide the engagement. The compressed and elastically deformed pad serves as a friction coupling between the tool 200 and the lens 230 and allows any torque delivered around the central axis A (also the optical axis of the camera system) to be translated into rotational motion that either drives the lens 230 into or out of the threaded mounting hole 430 in the camera body 432. The diameter DP of the pad 250 is sufficient to ensure that a portion of the pad perimeter 252 resides outside the front edge of the tool. This ensures a firm and even grip on the lens, and prevents the tool from damaging the lens due to metal-on-metal contact. Note that the outer diameter DT of the tool 200, at least in the vicinity of the cavity 220 is less than the expected diameter DB of the surrounding structure (e.g. the illuminator/ferrule) 440 on the camera body 432. This ensures that the tool passes into the Gap G1 between the lens and the surrounding structure free of any interference therebetween.

The tool can be constructed from any material with sufficient durability to withstand continuous use in, for example, a manufacturing environment. In an embodiment, an aluminum alloy, such as 6061 can be employed. In alternate embodiments a polymer and/or composite, such as ABS, polycarbonate, nylon (e.g. glass-filled), Delrin, and the like, can be used. Other materials or combinations of materials are expressly contemplated. The pad can be provided as a disposable piece that is used once or at most several times before it is discarded. In an alternate embodiment, the pad can comprise a molded structure that is inserted partly or fully into the cavity and conforms to the sidewalls—having a saucer shape, for example. In operation, the user obtains a pad, places in over the lens or the cavity in an appropriate alignment and engages the lens with the tool. The lens is then rotated to either tighten or loosen it. Note that a locking ring 450 is used to provide a limit to inward travel of the lens relative to the camera body. The position of this ring 450 can be adjusted prior to final tightening of the lens by the tool.

Figure 5:
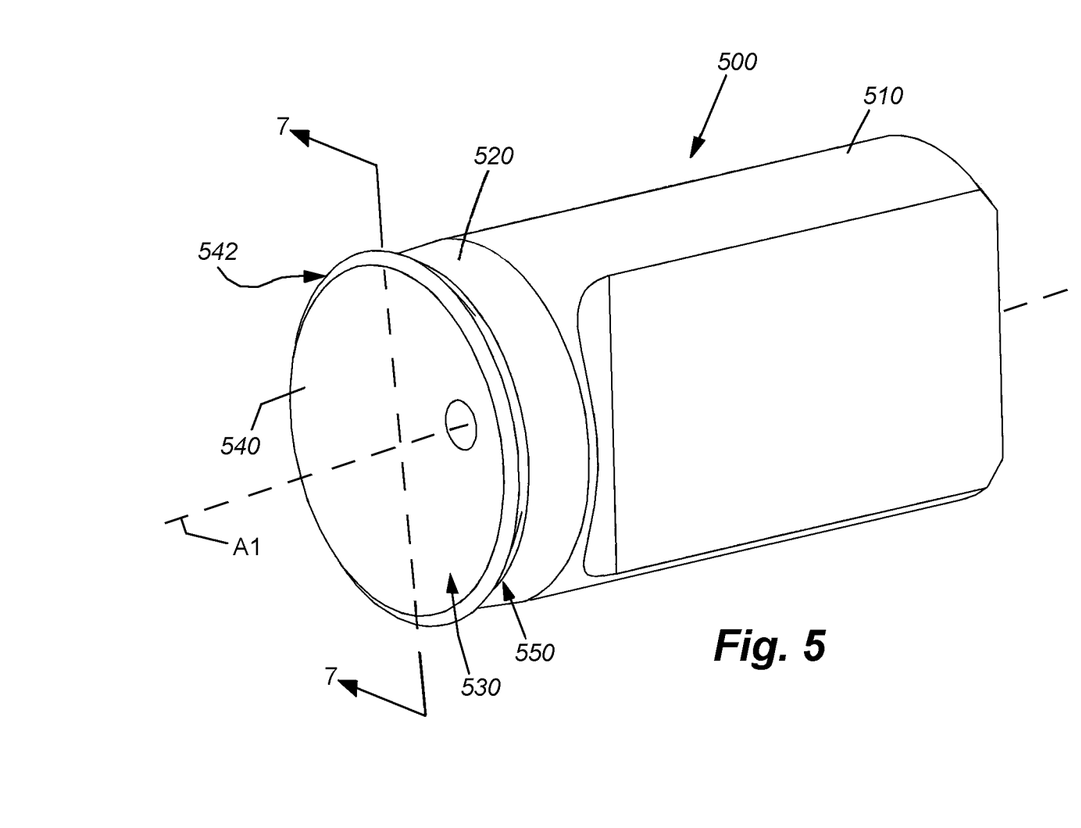
FIG. 5 is a perspective view of a too for installation and removal of lenses including an integral friction-generating, elastomeric pad and a body adapted for gripping by a hand according to another illustrative embodiment.
Figure 6:
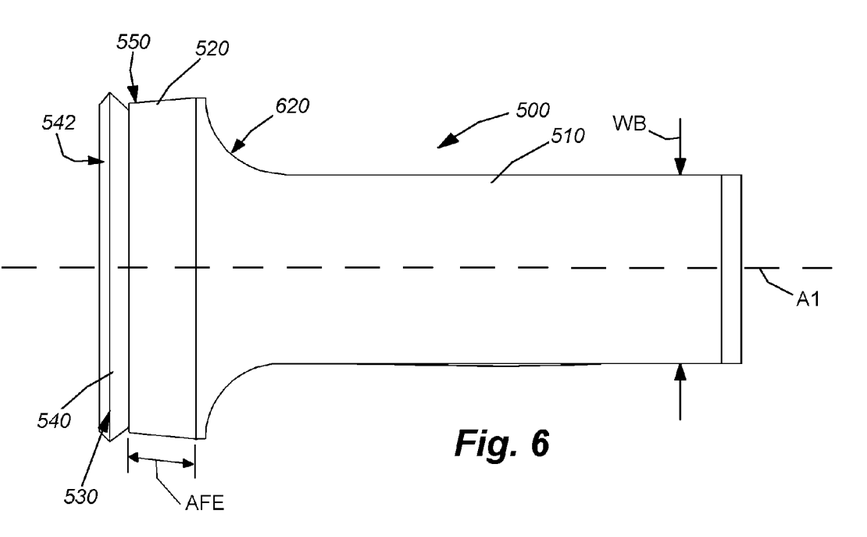
FIG. 6 is a top view of the installation and removal tool of FIG. 5.
Figure 7:
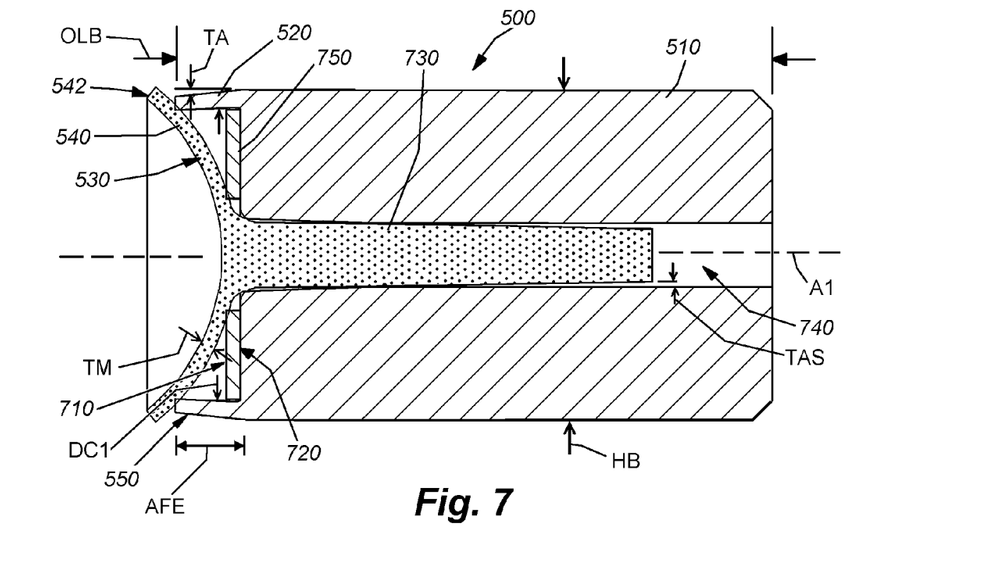
FIG. 7 is a side cross section of the installation and removal tool taken along line 7-7 of FIG. 5.

The socket-based tool of the embodiment 200 is generally contemplated for long-term use in a manufacturing environment. However, end users and others can desire to install, remove or adjust a camera lens on a unit in the field under certain circumstances. FIGS. 5-7 show a tool 500 that is adapted for manual use by an end user. This tool can also be employed by manufacturing personnel. The body 510 of the tool 500 can be constructed from any acceptable material, such as a metal (e.g. aluminum) or, illustratively, a molded polymer, such as ABS. Another polymer and/or composite, such as Delrin, Polystyrene, polycarbonate, Acrylic or Nylon can also be used. The body 510 defines an elongated member having an oblique cross section along the plane perpendicular to the axis A1. That is, the body height HB is greater than the width WB so that it is more easily grasped. In an embodiment, the height HB is approximately 18 millimeters and the width WB is approximately 10 millimeters. The overall length OLB of the body 510 is approximately 32 millimeters. These dimensions are highly variable in alternate embodiments of the tool, and are provided as an illustrative embodiment that affords a compact, yet easily manipulable geometry for manual operation.

The front end 520 of the tool 500 is essentially cylindrical, with the body flaring outwardly from the narrow width in a radiused transition region 620. The front end 520 thereby defines a cylindrical cavity 710 surrounded by a forwardly/inwardly tapered (frustoconical) outer surface. The taper defines an angle TA (FIG. 7) of approximately 5 degrees (relative to the adjacent body top/bottom surface, and assists in helping to guide the tool into a gap (e.g. gap G1 in FIG. 4) between the lens side walls and the surrounding camera structure. The taper is optional in alternate embodiments. The axial length AFE of the front end 520 is approximately 3.5 millimeters in an embodiment. This dimension (AFE) is also the approximate depth of the cavity from the front edge to the cavity base 720. The diameter DC1 of the cavity 710 is approximately 16 millimeters in an embodiment. It can be another size, such as 17 millimeters in alternate embodiments depending upon the outer diameter of the lens for which the tool 700 is designed. Within the cavity 710 resides a concave, friction-generating, elastomeric member 530. The member 530 in this embodiment is constructed and arranged for repeated use without replacement. Thus it is constructed from a molded material. The material used to form the member 530 is highly variable. In an illustrative embodiment, the material is a 40 Shore A Silicone (available from a variety of commercial sources) that can be transparent, translucent or opaque. A variety of alternate friction-generating elastomeric materials with similar or equivalent characteristics can be used in alternate embodiments, including, but not limited to latex-based materials, synthetic rubber, and the like.

The member 530 more particularly defines a front gripping pad 540 in the shape of a concave cup in which part of the pad extends into the cavity 710 in the region of the axis A1. The perimeter edge 542 of the pad 540 extends outwardly beyond the outer rim 550 of the tool front end 520. This allows the material to elastically deform and flow/compress into the cavity 710 when the tool is pressurably engaged on the front face and sidewalls of a lens in a manner described above. The radial extension of the perimeter edge 542 is sufficient to enable the perimeter edge of the pad 540 to remain radial outside the edge 550 of the tool front end 520.

The pad 540 is unitarily connected to a slightly rearwardly tapered shaft 730. The shaft 730 resides in a similarly sized bore hole 740 of approximately 3.5 millimeters in diameter that runs the length of the body 510. The taper angle TAS (FIG. 7) is approximately 1 degree with respect to the wall of the bore hole 740. This taper enables the member 530 to be readily inserted into the tool during manufacturing and when replacement is desired. In an illustrative embodiment, the shaft 730 remains in place based upon a friction fit that restrains both axial and rotational motion. Since the pad is firmly in engagement with a lens face and sidewalls and also with the cavity 710, it resists rotation with respect to the tool during use. In alternate embodiments, the shaft can be longer or shorter and include various structures (such as a bulb) that interact with detents and/or other structures in the tool. Alternatively, the shaft or another portion of the member can be adhered to the tool using an appropriate adhesive, such as silicone. In general a wide variety of techniques that should be clear to those of skill can be used to secure the member and/or pad to the tool and/or cavity.

As an option, an annular disk 750 is adhered to the base 720 of cavity 710 coaxial with the shaft 730. This disk 750 can be provided in certain embodiments where the tool body material exhibits reduced frictional grip with respect to the pad and additional friction is desired. The disk is constructed from a material with sufficient frictional characteristics, such as ABS or another polymer. It can include a textured surface in various embodiments. The thickness of the disk is highly variable, but should allow sufficient depth for the cavity. In embodiments where the tool body is constructed from a sufficiently frictional material, the disk is omitted and the pad compresses directly onto the cavity inner sidewalls and base.

Note, as used herein, the term "pad" can refer to either a separate material piece, such as used in the embodiment of FIGS. 1-4 or the lens-engaging front portion of a mounted member, such as used in the embodiment of FIGS. 5-7, or any lens-engaging, elastomeric, frictional material (in molded form, sheet form, etc.) that resides at least in part in a cavity of the tool. Additionally, the illustrative "diametral difference" between the outer diameter of the lens adjacent to its front (exposed) face and the inner diameter of the cavity adjacent to its edge is defined so that the pad compresses between the lens sidewalls and the cavity sidewalls to provide frictional engagement that is free of damage to the lens surface and tearing or other damage to the pad during at least one use cycle. A diametral difference of approximately 1 millimeter affords a sufficient difference for the pads contemplated herein, but a different diametral difference can be employed for pads having a different set of thickness and/or compressibility.

In operation the hand-gripped tool 500 is brought axially into engagement with a lens so that the cavity overlies the lens front face and outer sidewalls with the pad deforming and compressing against the inner sidewalls of the cavity to establish a frictional grip therebetween. The user then rotates the tool about the axis to either tighten or loosen the lens as appropriate and withdraws the tool axially when complete.

Figure 8:
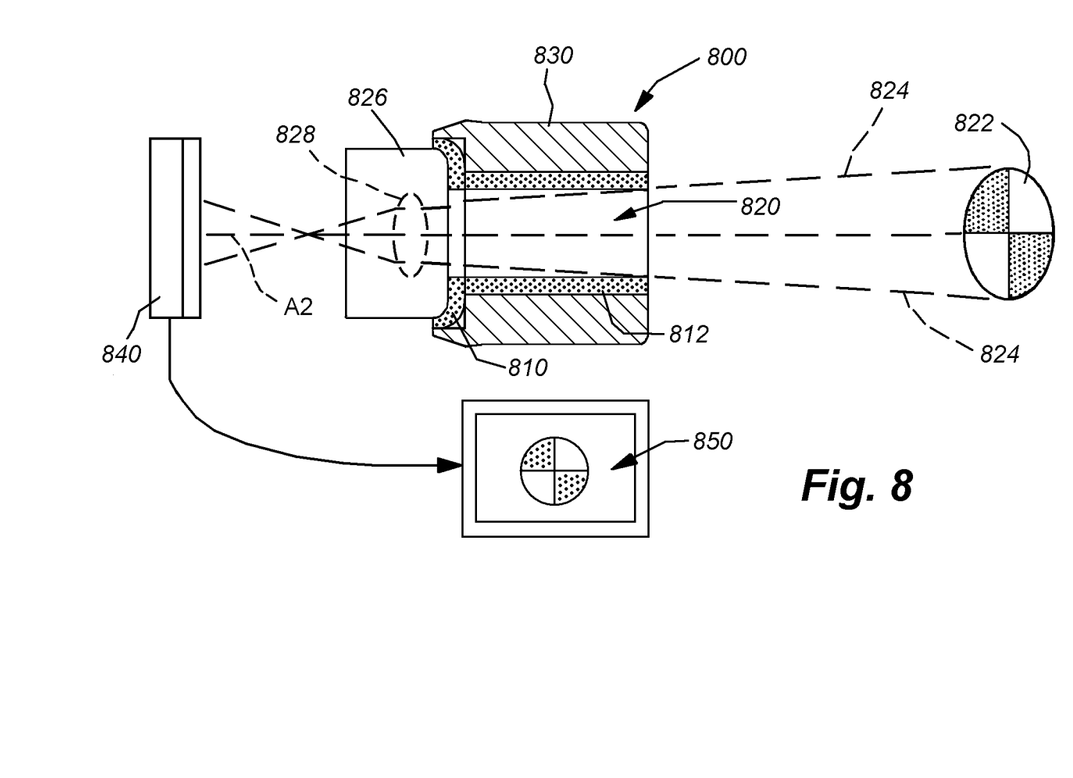
FIG. 8 is a side cross section of a hand-gripped tool for installation and removal of lenses engaged with an exemplary lens so that light passes from an object to the lens to assist in focusing the lens during adjustment thereof, according to an alternate embodiment.

In another embodiment shown in schematic cross section in FIG. 8, it is contemplated that the cup-like pad 810 and attached shaft (if any) 812 can include a central open bore 820, aligned with the lens/camera axis A2, that is sufficient to channel light (dashed lines 824) to the optics 828 of the lens 826. As such, the lens 826 can acquire an image of an object or other fiducial 830 while the user is engaging and rotating the lens with the body 830 of tool 800. In this manner, the user can employ optical feedback from an image displayed (display 850) by the camera sensor and associated circuitry 840 to find the best position for the lens. In this embodiment, the tool body bore and member bore 820 can define a large diameter than the bore hole 740 of the embodiment of FIGS. 5-7. The body 510 of the tool is in most instances sufficient in size to accommodate a hole that enables passage of light from a scene to the lens optics. In such an embodiment, the length of the graspable portion of the body can be shorter to afford a wider field of view.

Figure 9:
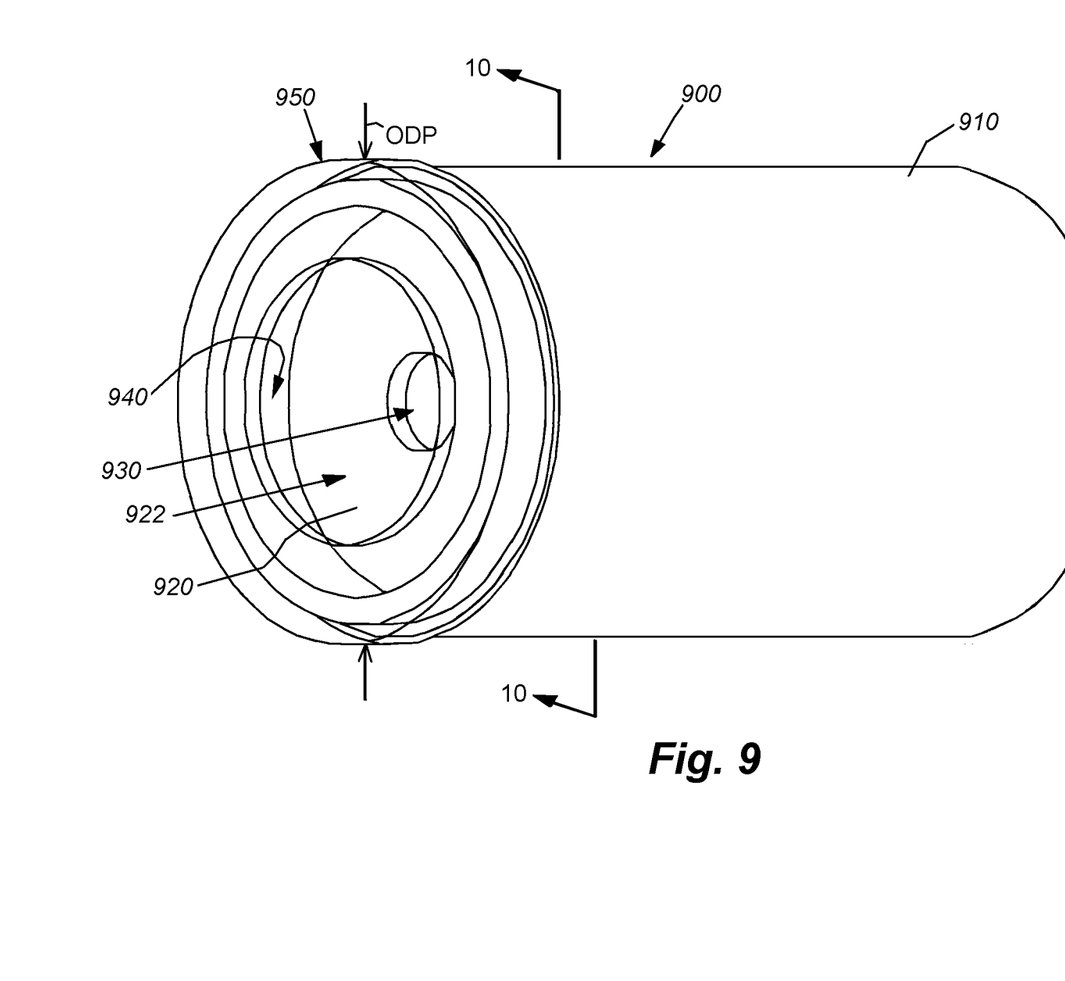
FIG. 9 is a perspective view of a tool for installation and removal of lenses defining a cylinder with a molded, elastomeric, friction-generating member that allows light to pass therethrough according to another alternate embodiment.
Figure 10:
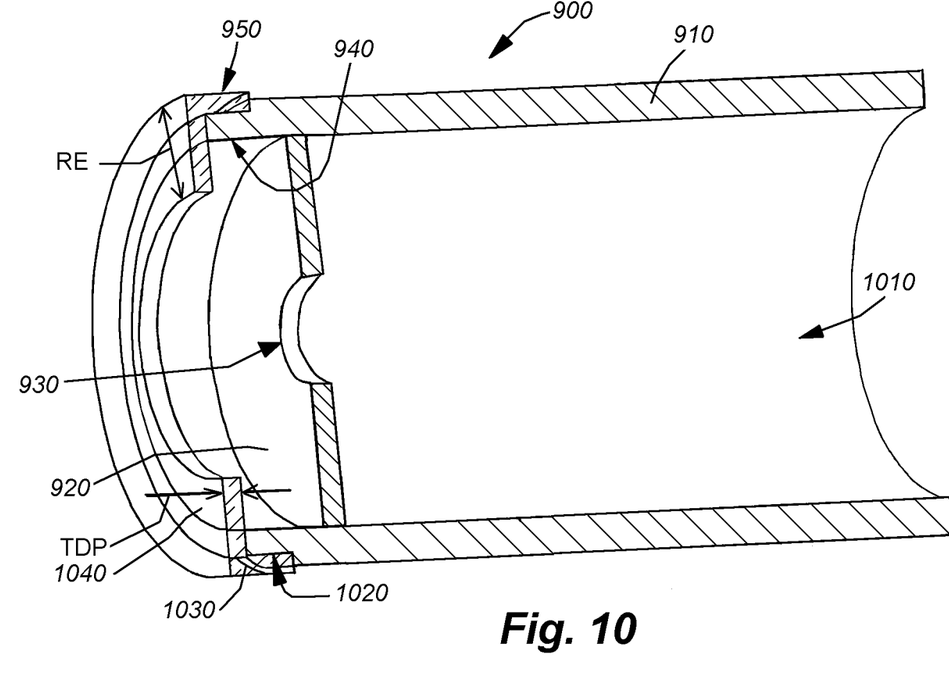
FIG. 10 is a perspective cutaway view taken along line 10-10 of FIG. 9.

In another "pass-through" embodiment, shown in FIGS. 9 and 10, the tool 900 includes a cylindrical body 910 defining an open interior rearward of the cavity base 920. The inner diameter of the rear interior space 1010 is highly variable, but typically sufficient to enable a scene of a given size and distance to be imaged by a lens positioned adjacent to an open aperture 930 in the base. Illustratively, an inner diameter of the body 910 is approximately 15 millimeters and the overall axial length of the body is approximately 32 millimeters. In an embodiment, the aperture 930 can define a diameter of approximately 3 millimeters. Illustratively, the aperture 930 can have a diameter smaller, similar to or slightly larger than that of the lens optic. The cavity base 920 defines a cavity 922 with an inner sidewall. The cavity 922 has a diameter (i.e. on the inner sidewall 940) and depth similar to other embodiments described hereinabove. Notably, in this embodiment the elastomeric, friction-generating pad 950 is a molded member seated in an external, annular shelf 1020 (see FIG. 10 for detail) on the front edge of the tool body 910. In an embodiment, the shelf is approximately 2 millimeters. The pad 950 defines an L-shaped cross section with an annular rim 1030 that overlies the shelf 1020 and defines a pressed, friction fit. The pad 950 is constructed from silicone or another material described generally herein. Adhesives can also be employed to form a more permanent joint between the tool body and pad. An open disk portion 1040 extends radially inwardly from the annular rim 1030. The radius RE is variable, but typically enables the disk portion to fold against the cavity inner sidewall 940 with sufficient contact of the engaged outer sidewall of a lens. This generates friction that allows for torsional rotation of the lens by the tool 900. The radius RE allows for the free passage of light from the base aperture 930 to the lens optic. Likewise, the thickness TDP of the disk portion 1040 can be similar to that of other pads described above, and the outer diameter ODP (FIG. 9) of the pad 950 is smaller that the inner diameter of structures surrounding the lens on the camera body (e.g. 18-19 millimeters). In various embodiments, the base can also include a supplemental, annular, friction-generating disk (not shown) adhered thereto (similar in shape to disk 750). The optional disk contains an open central aperture and engages the front face of the lens to enhance the frictional contact therebetween. It can be constructed from an appropriate elastomer, such as silicone as described herein. The body 910 can also be adapted for hand gripping (using detents, texturing, elastomeric coatings, etc., and/or attachment of a tool with appropriate clearance for the light path as described above.

It should be clear that the above-described tool for installing and removing a lens from a camera affords a relatively easy-to-use, non-damaging and versatile solution for a difficult-to-reach lens. It can be adapted readily to a manufacturer or end user with differing skill levels. It is inexpensive and also adaptable to a wide range of lens types and sizes, typically associated with board-mount applications.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the tool body can also be adapted for both direct grasping by a user and attachment of a handle or lever (e.g. a torque wrench). In one alternate embodiment, the socket version can include surface texture for increased grip or detents to assist grasping. For the purpose of this description the term "elastomeric material" shall refer to any appropriate friction-generating, polymer elastomer with sufficient durometer and tear resistance to allow for accommodating a typical tightening and loosening torque appropriate to a typical board-mount lens. Accordingly, this description is meant to be taken only by way of example, and not to otherwise limit the scope of this invention.

What is claimed is:

1. A tool for installing and removing a lens having a front face, outer sidewalls adjacent the front face and an outer diameter of the outer sidewalls, the tool comprising:
   a body having a cavity on a front end thereof, the cavity with inner sidewalls defining a diametral difference wherein an inner diameter of the inner sidewalls is greater than the outer diameter of the outer sidewalls of the lens; and
   a pad constructed of an elastomeric material that is continuously formed so as to completely overlap the cavity and, in a resting state define a perimeter that extends radially beyond an outer perimeter edge of the tool at the front end,
   wherein the tool is constructed and arranged to engage the front face and the outer sidewalls of the lens with the pad elastically deforming and compressing into the cavity against the inner sidewalls to provide a frictional engagement between the lens and the pad.

2. The tool of claim 1 wherein the inner sidewalls of the cavity define an approximately straight cylinder.

3. The tool as set forth in claim 1 wherein the front end defines an outer diameter that is less than an inner diameter of structures on a camera body surrounding the lens.

4. The tool as set forth in claim 1 wherein the body includes a socket for interconnecting a wrench drive head.

5. The tool as set forth in claim 1 wherein the body includes a shape constructed and arranged for grasping by a hand to rotate the tool about an approximate optical axis of the lens when a longitudinal axis of the body is aligned approximately therewith.

6. The tool as set forth in claim 5 wherein the body defines an oblique shape on a cross-sectional plane taken perpendicular to the longitudinal axis.

7. The tool as set froth in claim 5 further comprising a bore located along the longitudinal axis that frictionally receives a unitary shaft connected to the pad.

8. The tool as set forth in claim 7 wherein the pad defines a concave dish extending at least in part into the cavity adjacent the longitudinal axis.

9. The tool as set forth in claim 5 wherein the front end defines a taper extending along the body from a predetermined location to a front edge of the front end.

10. The tool as set forth in claim 1 wherein the elastomeric material is a silicone-based material.

11. The tool as set forth in claim 1 wherein the diametral difference is approximately one millimeter.

12. The tool as set forth in claim 1 wherein the pad defines a separate component constructed and arranged to be manually inserted between the cavity and the lens.

13. A tool for installing and removing a lens, the tool comprising:
   a body having a cavity on a front end thereof, the cavity including inner sidewalls; and
   a pad constructed of an elastomeric material that is continuously formed so as to completely overlap the cavity and, in a resting state define a perimeter that extends radially beyond an outer perimeter edge of the tool at the front end,
   wherein the tool is constructed and arranged to engage a front face and outer sidewalls of the lens with the pad elastically deforming and compressing into the cavity against the inner sidewalls to provide a frictional engagement between the lens and the pad.

14. The tool of claim 13 wherein the inner sidewalls of the cavity define an approximately straight cylinder.

15. The tool as set forth in claim 13 wherein the front end defines an outer diameter that is less than an inner diameter of structures on a camera body surrounding the lens.

16. The tool as set forth in claim 13 wherein the body includes a socket for interconnecting a wrench drive head.

17. The tool as set forth in claim 13 wherein the body includes a shape constructed and arranged for grasping by a hand to rotate the tool about an approximate optical axis of the lens when a longitudinal axis of the body is aligned approximately therewith.

18. The tool as set forth in claim 17 wherein the pad defines a concave dish extending at least in part into the cavity adjacent the longitudinal axis.

19. A system comprising:
   a lens having a front face, outer sidewalls adjacent the front face and an outer diameter of the outer sidewalls;
   a tool for installing and removing the lens, the tool comprising:
      a body having a cavity on a front end thereof, the cavity with inner sidewalls defining a diametral difference wherein an inner diameter of the inner sidewalls is greater than the outer diameter of the outer sidewalls of the lens; and
      a pad constructed of an elastomeric material that is continuously formed so as to completely overlap the cavity and, in a resting state define a perimeter that extends radially beyond an outer perimeter edge of the tool at the front end,
   wherein the tool is constructed and arranged to engage the front face and the outer sidewalls of the lens with the pad elastically deforming and compressing into the cavity against the inner sidewalls to provide a frictional engagement between the lens and the pad.

* * * * *